(12) United States Patent
Eisele et al.

(10) Patent No.: US 12,062,890 B2
(45) Date of Patent: Aug. 13, 2024

(54) CABLE SHAVING TOOL

(71) Applicant: Hubbell Power Systems, Inc., Shelton, CT (US)

(72) Inventors: Will Eisele, Rochy Hill, CT (US); Brian Bourgoin, East Haddam, CT (US); Mark Fowler, Birmingham (GB)

(73) Assignee: HUBBELL POWER SYSTEMS, INC., Shelton, CT (US)

( * ) Notice: Subject to any disclaimer, the term of this patent is extended or adjusted under 35 U.S.C. 154(b) by 0 days.

(21) Appl. No.: 17/719,968

(22) Filed: Apr. 13, 2022

(65) Prior Publication Data
US 2023/0010340 A1   Jan. 12, 2023

Related U.S. Application Data

(60) Provisional application No. 63/220,243, filed on Jul. 9, 2021.

(51) Int. Cl.
*H02G 1/12*   (2006.01)

(52) U.S. Cl.
CPC ................. *H02G 1/1202* (2013.01)

(58) Field of Classification Search
CPC .. H02G 1/1202; H02G 1/1209; G02B 6/4497; G02B 6/245; G02B 6/25; G02B 6/443; G02B 6/566; B25F 1/006; B26D 3/001; B26D 3/08; B26D 3/16
USPC ....... 83/870; 30/90.4, 90.9, 90.8, 90.1, 91.1, 30/91.2; 81/9.4, 9.41
See application file for complete search history.

(56) References Cited

U.S. PATENT DOCUMENTS

| | | | |
|---|---|---|---|
| 2,120,398 A * | 6/1938 | Edwards | H02G 1/1229 30/91.2 |
| 4,130,031 A | 12/1978 | Wiener | |
| 4,958,433 A | 9/1990 | Persson | |

(Continued)

FOREIGN PATENT DOCUMENTS

KR   20130039318 A  *  4/2013  ............... G02B 6/25

OTHER PUBLICATIONS

Written Opinion of the International Searching Authority in corresponding International Application No. PCT/US2022/024637 dated Jan. 12, 2023.

(Continued)

*Primary Examiner* — Ghassem Alie

(74) *Attorney, Agent, or Firm* — Ruggiero McAllister & McMahon LLC

(57) ABSTRACT

A cable-shaving tool for midspan shaving of a cable jacket includes a housing bottom having a first hinge member along an upper edge, a cavity, and at least one cable groove extending through a length of the housing bottom. The cable-shaving tool includes a second housing shell having an interior portion having at least one recess having an upper control surface, an exterior portion, and a second hinge member along a second housing shell edge engageable with the first hinge member wherein the second housing shell is rotatable about the first hinge member. The cable-shaving tool includes a blade removably securable between a blade holder and a blade support surface on the housing lid, the blade extending within a portion of the recess and a movable cable ramp disposed in the cavity of the bottom housing for urging the cable toward the blade when the second housing shell is in a closed position.

19 Claims, 12 Drawing Sheets

(56) References Cited

U.S. PATENT DOCUMENTS

| | | | | |
|---|---|---|---|---|
| 4,972,581 A | * | 11/1990 | McCollum | G02B 6/245 |
| | | | | 30/90.1 |
| 5,093,992 A | * | 3/1992 | Temple, Jr. | G02B 6/4497 |
| | | | | 30/90.4 |
| 5,140,751 A | | 8/1992 | Faust | |
| 6,089,125 A | * | 7/2000 | Cheng | H02G 1/1212 |
| | | | | 81/9.44 |
| 2007/0234858 A1 | * | 10/2007 | Sullivan | H02G 1/1295 |
| | | | | 83/13 |
| 2011/0113633 A1 | * | 5/2011 | Daggett | H02G 1/1229 |
| | | | | 30/91.2 |
| 2015/0378126 A1 | * | 12/2015 | Migenes | G02B 6/4497 |
| | | | | 30/90.1 |
| 2016/0172828 A1 | * | 6/2016 | Liao | H02G 1/1212 |
| | | | | 30/91.2 |
| 2017/0110860 A1 | | 4/2017 | Repton | |
| 2021/0255413 A1 | * | 8/2021 | Iburg | G02B 6/25 |
| 2023/0051525 A1 | * | 2/2023 | Denton | G02B 6/25 |

OTHER PUBLICATIONS

International Search Report of the International Searching Authority in corresponding International Application No. PCT/US2022/024637 dated Jan. 12, 2023.

International Preliminary Report on Patentability Chapter I in corresponding International Application No. PCT/US2022/024637 dated Jan. 18, 2024.

* cited by examiner

CABLE SHAVING TOOL

BACKGROUND OF THE INVENTION

1. Field of the Invention

The present invention relates to a shaving tool for cable midspan access on a wide range of cable diameters.

2. Description of Related Art

Fiber optic cables continue to evolve and fiber optic cable installation in buildings, particularly the final leg of a telecommunications network that delivers services to retail end users (the "last mile") required cables to be run around dwellings requiring many junctions. Many cables are run in and through buildings requiring durable outer jackets. Some cables are also encased in thicker mini-duct outer sheathing. Many of these cables have Kevlar yarn under the sheathing for added tensile durability. The outer jacket and Kevlar (if present) protect the inner fiber which is encapsulated in a tight or loose buffer coating.

The proliferation of fiber to the home and the enterprise of fiber optic cable deployment requires that installers gain internal "mid-span" access to a cable which has already been deployed operational and the ends are not accessible. This midspan access would be required for a splice or additional junction. The range of sheathing thickness and diameters continues to increase and there is no real industry standard due to an increasing unique application need for end users throughout the world.

While hand tools exist in the market today which provide midspan cuts to cable jackets using differing modalities, they are not without shortcomings. Two examples include slitting operations performed using slitting tools and shaving operations performed by shaving tools.

Slitting tools usually have dual/opposing blades which pierce the jacket and thus tent to be very specific to a cable diameter and jacket thickness. Shaving tools scalp a portion of the round cable to make a chip, which provides internal cable access. Current shavings tools of the prior art have a specific size channel for a cable. These channels can accommodate a small range of cable diameters, but the channel is fixed and sets a specific recess for the blade. If too small of a cable is installed in a fixed channel, the blade will not cut (or even touch) the jacket. If too large of a cable is installed, it will bind and not fit the fixed channel. Due to the specific nature of the channel size, a tool can require a large number of fixed channels to cover a wide range (for example 1.5-5 mm) of cable diameters, even if they all had the same jacket thickness. Thus, a need exists to provide a cable shaving tool which can accommodate a variety of different cable diameters without the need for a specifically sized cable channel.

SUMMARY OF THE INVENTION

Bearing in mind the problems and deficiencies of the prior art, it is therefore an object of the present invention to provide a cable shaving tool which may accomplish shaving cut operations on a range of cable diameters.

It is another object of the present invention to provide a midspan shaving tool which may perform precise cutting operation without need to adjust a blade depth.

A further object of the invention is to provide a midspan shaving tool that provides multiple cutting depths which are working across a range of cable diameters.

It is yet another object of the present invention to provide a zero-clearance vertical fit on a cable at the start of the cut.

It is still another object of the present invention to provide a cable shaving tool which can accommodate a variety of different cable diameters without the need for a specifically sized cable channel.

Still other objects and advantages of the invention will in part be obvious and will in part be apparent from the specification.

The above and other objects, which will be apparent to those skilled in the art, are achieved in the present invention which is directed to a cable-shaving tool for midspan shaving of a cable jacket, the tool including a first housing shell or housing bottom having a first hinge member along an upper edge of the first housing shell, a cavity, and at least one cable groove extending through a length of the first housing shell. The cable-shaving tool includes a second housing shell or housing lid having an interior portion, an exterior portion, and a second hinge member along a second housing shell edge, the second hinge member engageable with the first hinge member wherein the second housing shell is rotatable about the first hinge member, the interior portion including at least one recess having an upper control surface. The cable-shaving tool includes a blade holder removably secured to the housing lid, a blade removably securable between the blade holder and a blade support surface on the housing lid, the blade extending within a portion of the at least one recess and a movable cable ramp disposed in the cavity of the bottom housing, the cable ramp having at least one cable shelf extending along a length of the ramp, the cable shelf for urging the at least one cable shelf toward the blade when the second housing shell is in a closed position. A cable may be placed in the at least one cable groove and encapsulated within the cable-shaving tool upon closing the second housing shell whereby the ramp urges the cable jacket against the upper control surface of the at least one recess and the blade initiates a cut of a predetermined depth into the cable jacket upon closing of the second housing shell and shaves a portion of the cable jacket upon moving the cable-shaving tool along a length of the cable. The cable ramp may further include an end having a ramp hinge, such that the ramp may pivot about the end as the at least one cable shelf is urged towards the blade. The cable-shaving tool may further include a first magnet secured in the first housing shell and a second magnet secured in the second housing shell wherein the first contacts the second magnet when the lid is in the closed position, holding the cable-shaving tool in the closed position when moving the cable-shaving tool along the length of the cable. The cable ramp may further include a resilient member, the resilient member within a bottom surface of the cable ramp and in contact with a bottom surface of the first housing shell cavity. The second housing shell may further include at least one chip clearance channel and the blade holder further includes at least one blade channel. The second housing shell exterior portion may include a recess having ridges. The first housing shell may further include at least one indicator member for visually identifying the proper channel for a specific cable jacket cut depth. The cable jacket may have a diameter from 1.5 mm to 5 mm. The predetermined depth may be from 0.4 mm to 1.2 mm.

Another aspect of the present invention is directed to a cable-shaving tool for midspan shaving of a cable jacket, the tool including a first housing shell having a first hinge member along an upper edge of the first housing shell, a first and second cable groove extending through a length of the first housing shell, and a cavity in the first housing shell. The cable-shaving tool includes a second housing shell having an interior portion, an exterior portion, and a second hinge member along a lid edge, the second hinge member engageable with the first hinge member wherein the lid is rotatable about the first hinge member, the interior portion including a first recess having a first depth terminating in a first upper control surface, the interior portion including a second recess having a second depth terminating in a second upper control surface. The cable-shaving tool includes a blade holder removably secured to the housing lid, a blade removably securable between the blade holder and a blade support surface on the housing lid, the blade extending within a portion of the first and second recess and a movable cable ramp disposed in the cavity of the bottom housing, the cable ramp having first and second cable shelf extending along a length of the ramp, the cable ramp for urging the first and second cable shelf toward the blade when the second housing shell is in a closed position. The first cable groove, first cable shelf, and d first upper control surface are aligned when the second housing shell is in a closed position and the second cable groove, second cable shelf, and second upper control surface are aligned when the second housing shell is in a closed position. A cable may be placed in the cable grooves and encapsulated within the tool upon closing the second housing shell whereby that the ramp urges the cable jacket against the first upper control surface and/or the second upper control surface, and the blade initiates a cut of a predetermined depth into the cable jacket upon closing of the second housing shell and shaves a portion of the cable jacket upon moving the cable-shaving tool along a length of the cable. The predetermined depth is the distance from the blade to the first upper control surface and/or the second upper control surface. The cable ramp may further include a ramp end having a ramp hinge, such that the ramp may pivot about the ramp end as the cable shelf is urged towards the blade. The cable-shaving tool may further include a first magnet secured in the first housing shell and a second magnet secured in the second housing shell wherein the first contacts the second magnet when the lid is in the closed position, holding the cable-shaving tool in the closed position when moving the cable-shaving tool along the length of the cable. The cable ramp may further include a resilient member, the resilient member within a bottom surface of the cable ramp and in contact with a bottom surface of the first housing shell cavity. The second housing shell may further include a first chip clearance channel and a second chip clearance channel and the blade holder may further include a first blade channel and a second blade channel. The second housing shell exterior portion may include a recess having ridges. The second housing shell may further include a first chip clearance channel and a second chip clearance channel. The blade holder may include a first blade channel and a second blade channel at least. The cable jacket may have a diameter from 1.5 mm to 5 mm. The predetermined depth may be from 0.4 mm to 1.2 mm.

Another aspect of the present invention is directed to a method for using a cable-shaving tool for midspan shaving of a cable jacket. The method includes providing a cable-shaving tool having a first housing shell having a first hinge member along an upper edge of the first housing shell, a first and second cable groove extending through a length of the tool housing and a cavity in the first housing shell, a second housing shell having an interior portion, an exterior portion, and a second hinge member along a lid edge, the lid hinge member engageable with the first hinge member such that the lid may rotate about the first hinge member, the interior portion including a first recess having a first depth terminating in a first upper control surface, the interior portion including a second recess having a second depth terminating in a second upper control surface, a blade holder removably secured to the housing lid, a blade removably securable between the blade holder and a blade support surface on the housing lid, the blade extending within a portion of the first and second recess and a moveable cable ramp disposed in the cavity of the first housing shell, the cable ramp having first and second cable shelf extending along a length of the ramp, the cable ramp configured to urge the first and second cable shelf toward the blade when the second housing shell is in a closed position. The first cable groove, first cable shelf and first upper control surface are aligned when the second housing shell is in a closed position and the second cable groove, second cable shelf and second upper control surface are aligned when the second housing shell is in a closed position. The method includes ensuring the lid is in an open position, selecting the first or second cable groove, placing a cable in the first housing shell such the cable is within the first or second cable groove and closing the second housing shell to encapsulate the cable within the cable-shaving tool. The method includes moving the cable-shaving tool in a direction along the cable such that the blade severs the cable jacket, thereby shaving a portion of the cable jacket a predetermined depth determined by a distance between the first upper control surface and an edge of the blade extending within the first recess, moving the second housing shell to the open position and removing the cable-shaving tool from the shaved cable. The method may include the step of removing the shaved portion of the cable jacket from the cable-shaving tool housing after the step of moving the cable-shaving tool in a direction along the cable.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-33 of the drawings in which like numerals refer to like features of the invention.

Figure 1:
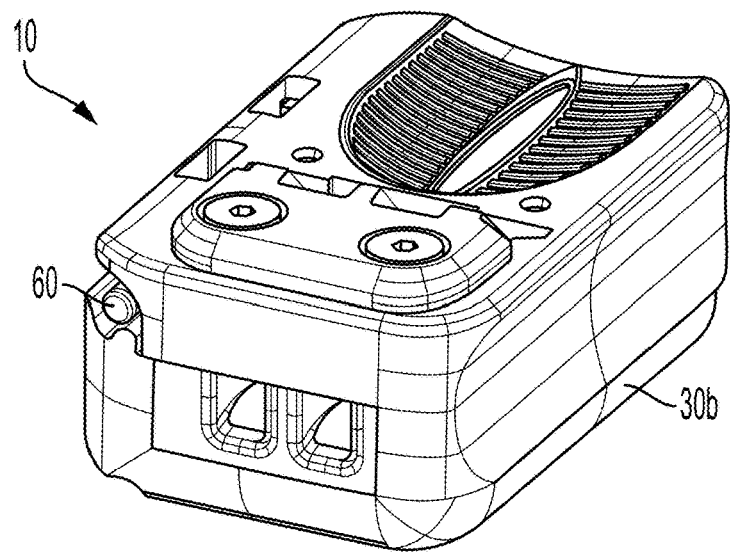
FIG. 1 is a top right front perspective view of the shaving tool according to the present invention.
Figure 2:
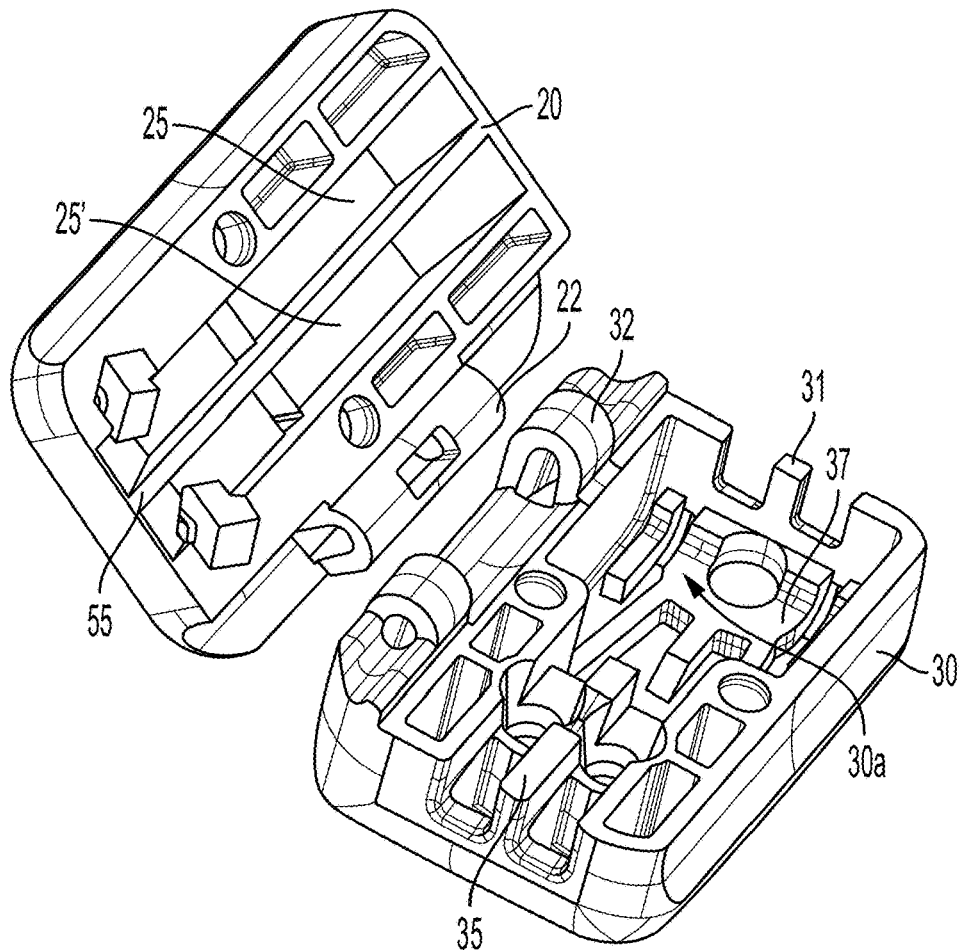
FIG. 2 is a top right front perspective view of the shaving tool housing bottom with the second housing shell in the open position.
Figure 3:
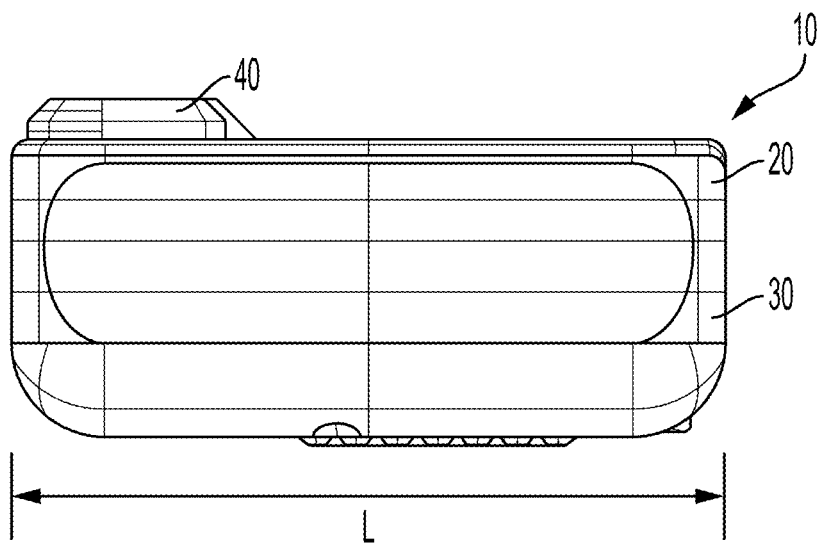
FIG. 3 is a right elevational view of the shaving tool shown in FIG. 1.
Figure 4:
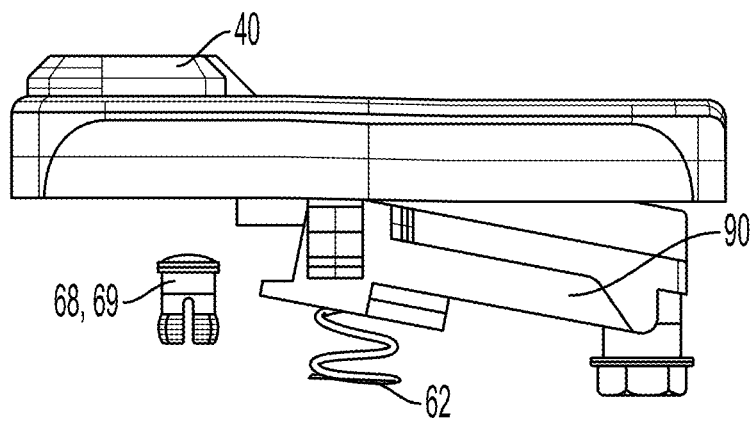
FIG. 4 is a right elevational view of the shaving tool with the tool housing bottom removed to show relative position of internal components.
Figure 5:
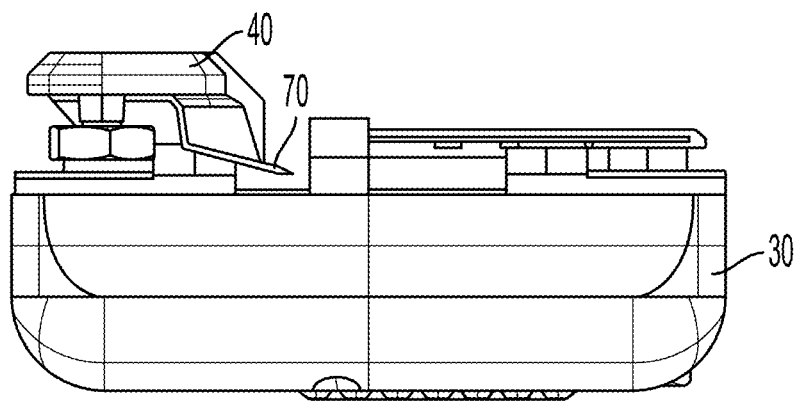
FIG. 5 is a right elevational view of the shaving tool with the tool housing lid removed to show relative position of internal components.
Figure 6:
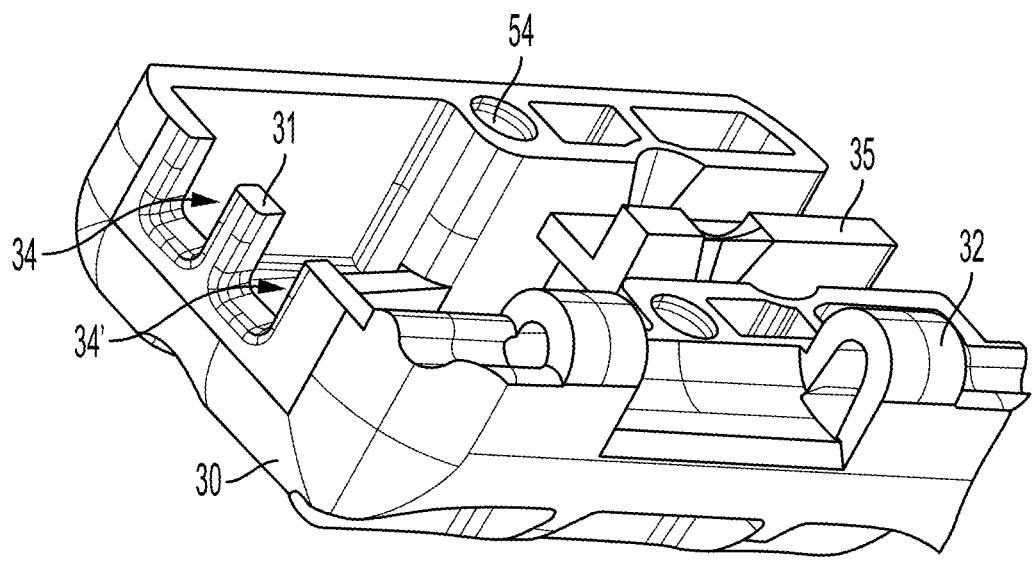
FIG. 6 is a top left rear perspective view of the shaving tool housing bottom.
Figure 7:
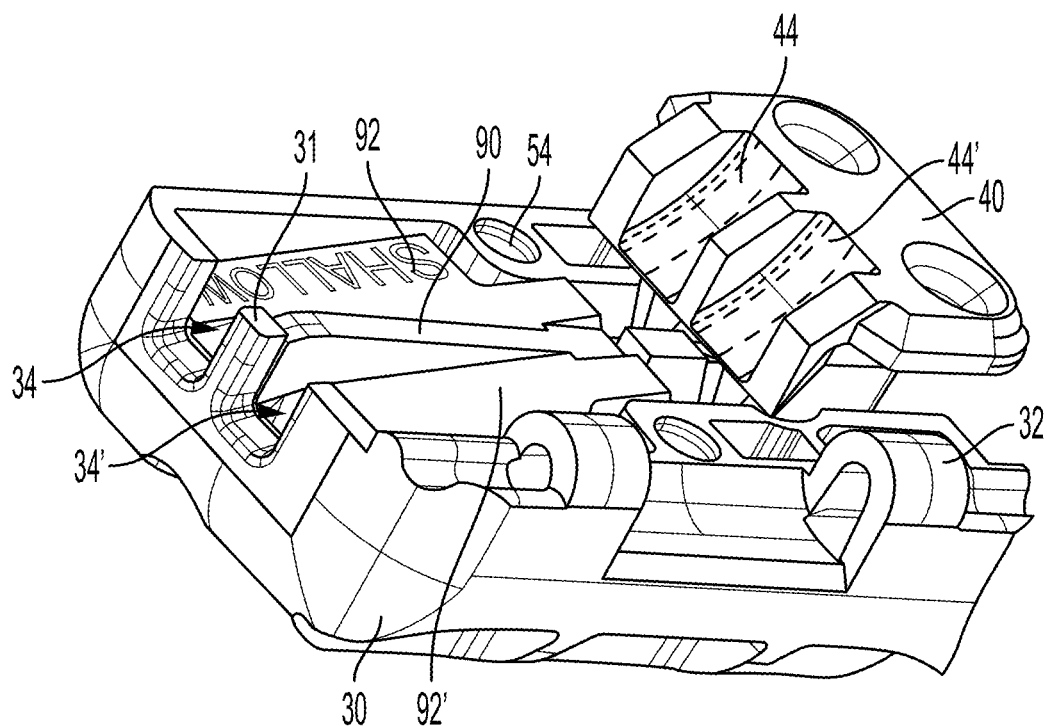
FIG. 7 is a top left rear perspective view of the shaving tool housing bottom and cable ramp with the blade holder shown in a relative position.
Figure 8:
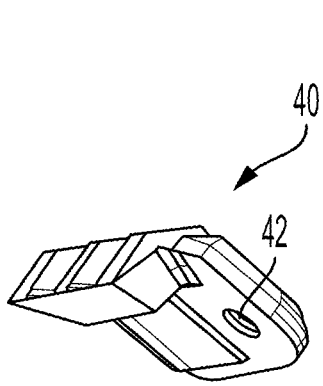
FIG. 8 shows a perspective view of the blade holder.
Figure 9:
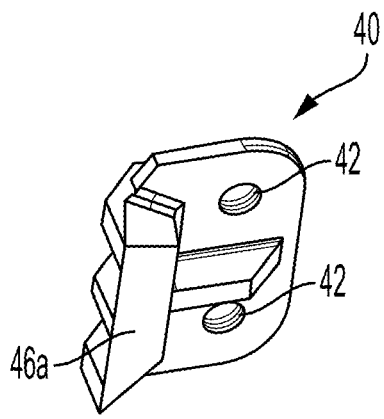
FIG. 9 shows a perspective view of the blade holder.
Figure 10:
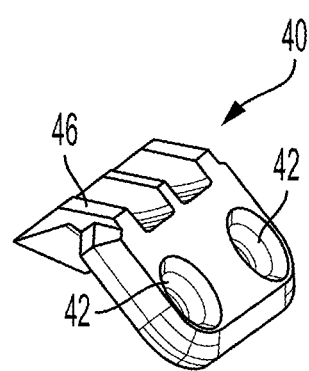
FIG. 10 shows a perspective view of the blade holder.
Figure 11:
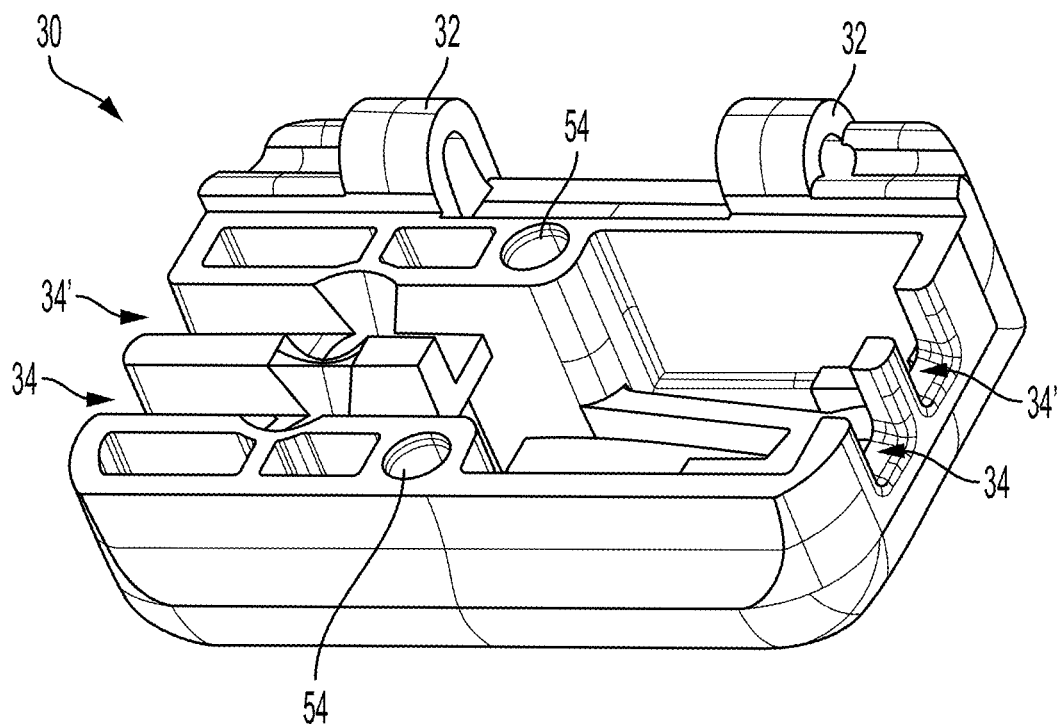
FIG. 11 shows a top rear right perspective view of the housing bottom.
Figure 12:
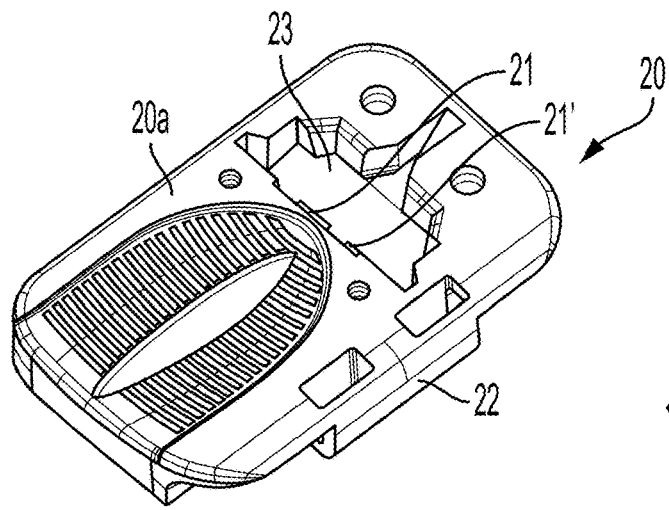
FIG. 12 shows a top rear left perspective view of the housing lid.
Figure 13:
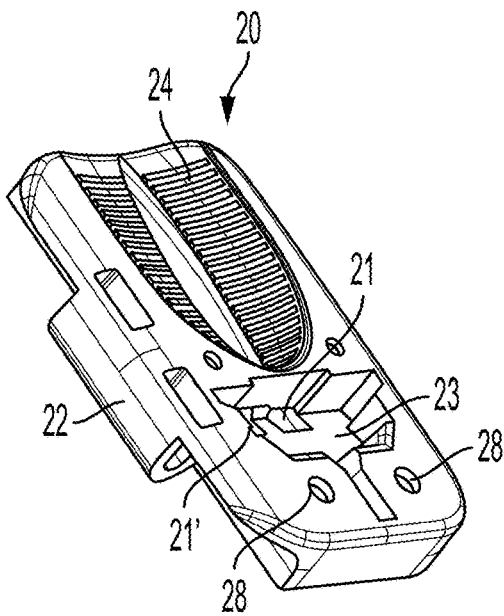
FIG. 13 shows a top front left perspective view of the housing lid.

The cable shaving tool 10 of the present invention is shown in the closed position in FIG. 1. The interior portions of the housing bottom 30 and housing lid 20 are shown in FIG. 2. The cable stripping tool 10 may be used in any orientation when shaving a cable to correspond with the orientation of the cable, so the housing bottom 30 may be also referred to as the first housing shell and the housing lid 20 may be referred to as a second housing shell. The cable shaving tool 10 performs cable shaving of a cable jacket 8 from a cable 9 shown in FIGS. 20A and 20B. The cable 9 may include a center conductor or fiber 5, a buffer tube 6, Kevlar yarn 7 or other strength layer and a cable jacket 8. The cable-shaving tool 10 consists of a housing bottom 30 which is of a generally rectangular or box-shape having an interior portion 30a and an exterior portion 30b, though other dimensions and shapes of housing 30 are not meant to be precluded. Along the peripheral edge of housing 30 is a first hinge member 32 for securing a housing lid 20 thereto via a lid hinge member 22 and pin 60. Lid hinge member 22 may also be referred to as the second hinge member since the orientation of the cable shaving tool 10 may be different than shown in the drawings depending on the orientation of the cable being shaved. The housing 30 further includes on the top interior surface 30a one or more recess(es) 54 which may include a magnet 50 secured therein. Located at the blade end 33 of housing 30 are one or more cable grooves 34, 34' forming channels spanning along the length of the housing 30, separated by a partition wall 35 therebetween. Approximately halfway along the length L of the housing 30 is formed a cavity 37 in which is disposed a cable ramp 90. Along the outer wall at the ramp end 31 of the housing 30 are located the cable grooves 34, 34'. Inside cavity 37 may be disposed one or more pivot lips 36 as well an aperture 39 located central to the housing interior and towards the ramp end 31 of cavity 37.

Figure 16:
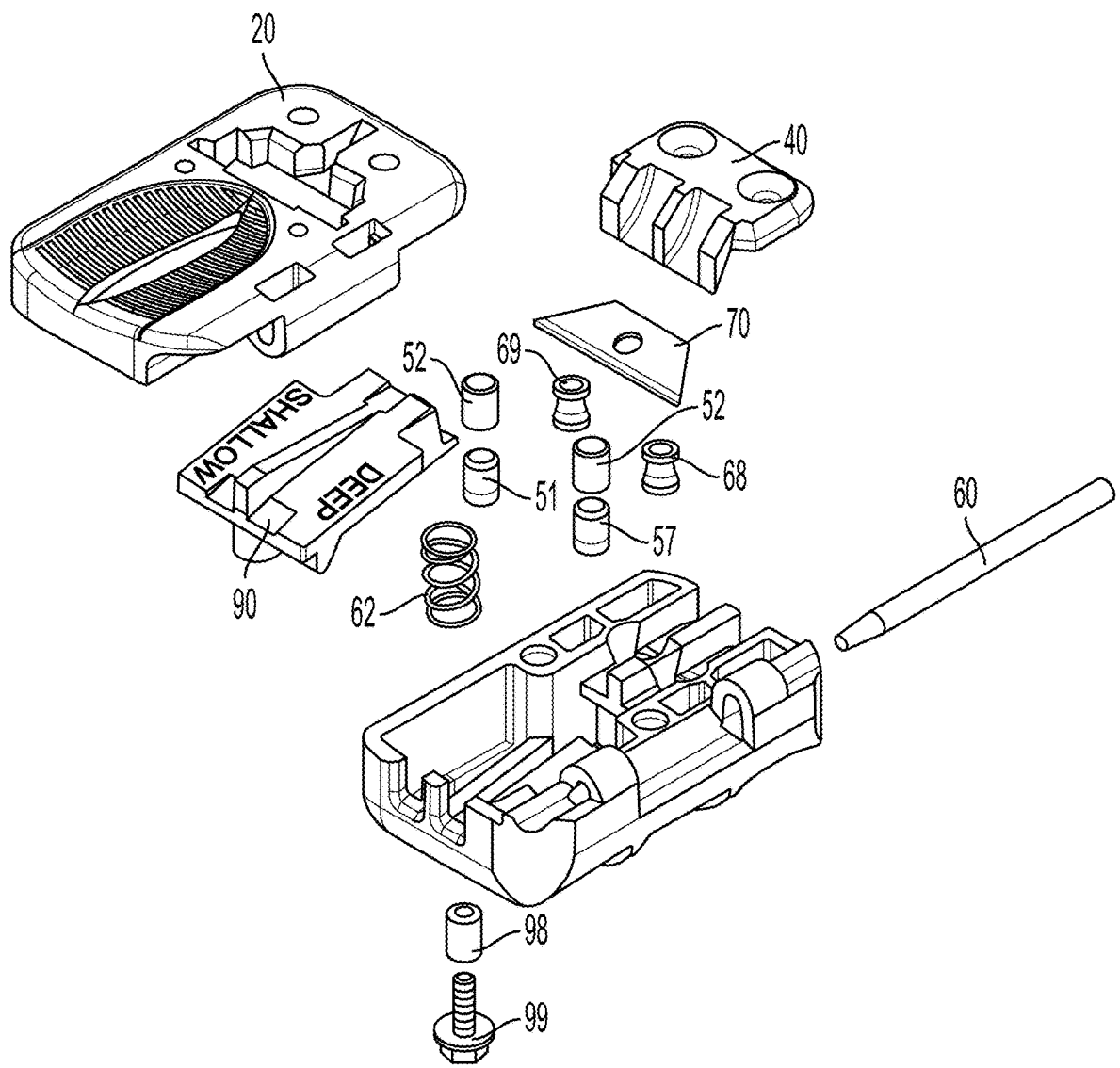
FIG. 16 shows a top rear left exploded view of the shaving tool shown in FIG. 1.
Figure 17:
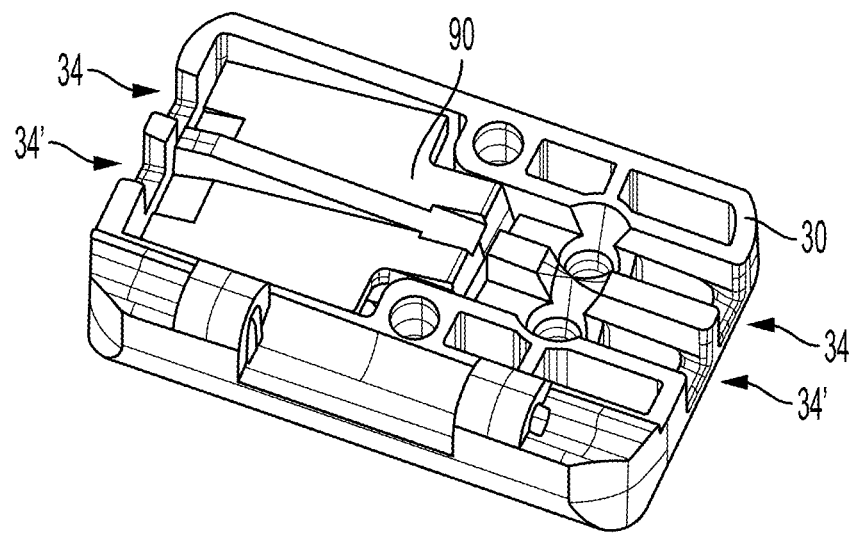
FIG. 17 shows a top front left perspective view of the housing bottom, cable ramp and indicators.
Figure 18:
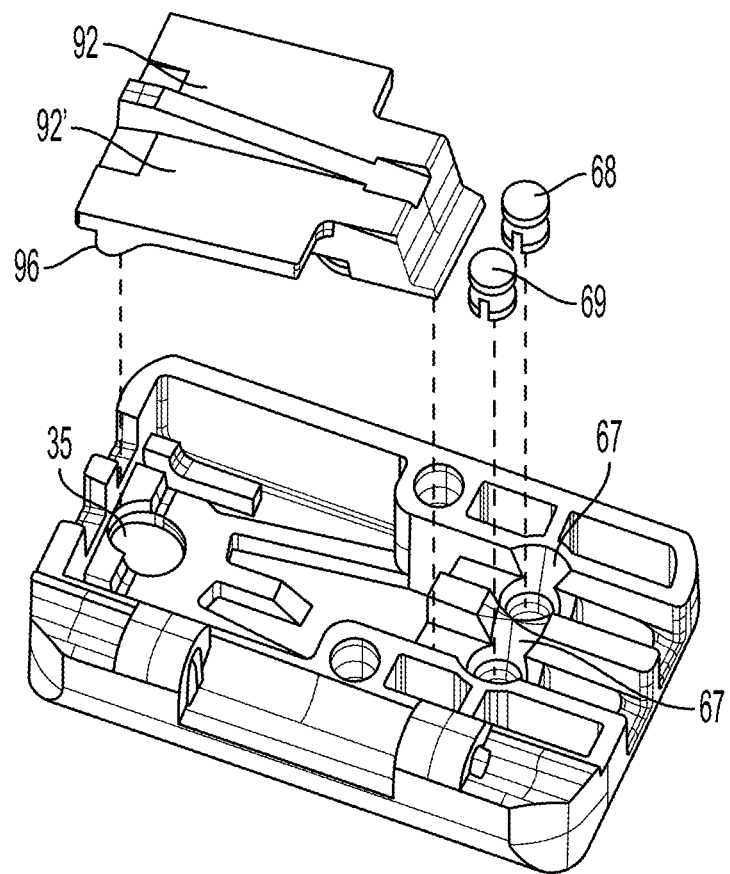
FIG. 18 shows a top front left exploded view of the housing bottom, cable ramp and indicators shown in FIG. 17.
Figure 19:
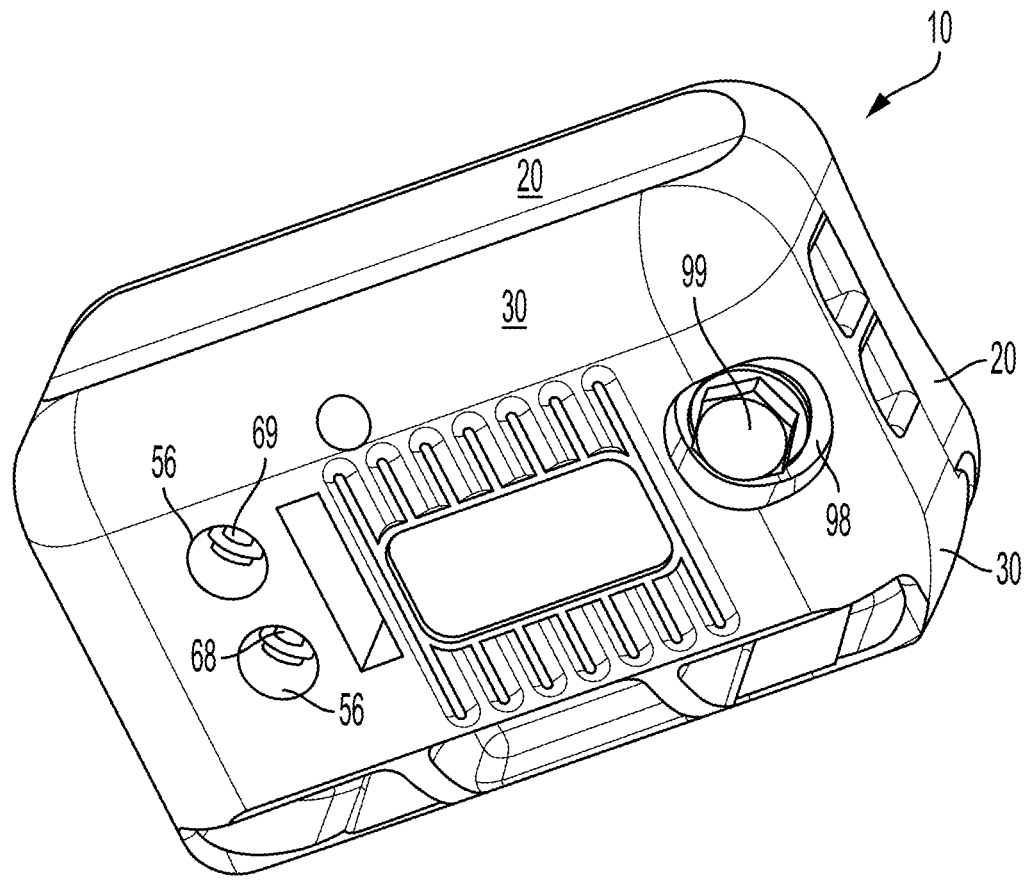
FIG. 19 shows a bottom right rear perspective of the shaving tool shown in FIG. 1.
Figure 20A:
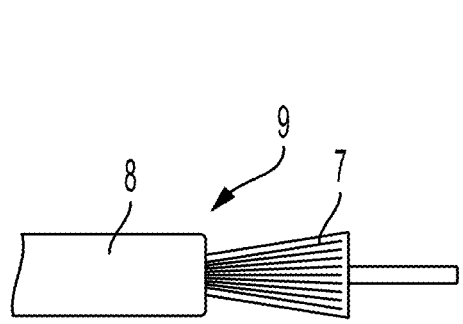
FIG. 20A is a side view of a stripped cable end.
Figure 20B:
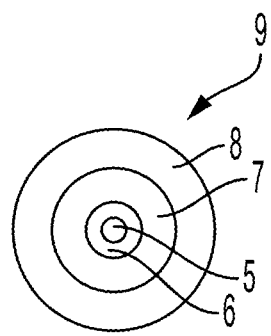
FIG. 20B is an end view of the stripped cable shown in FIG. 20A.
Figure 21:
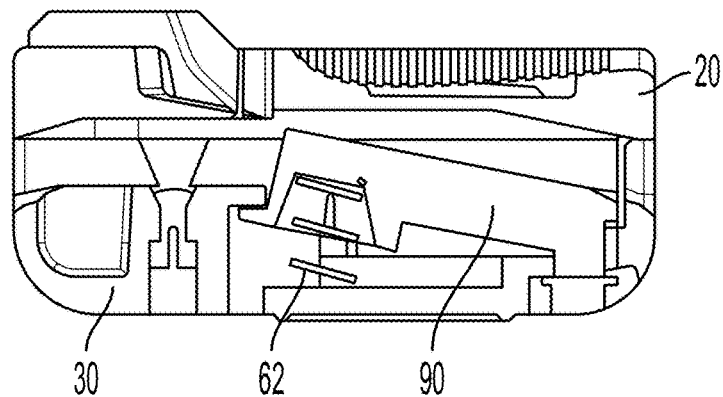
FIG. 21 is a right cross-sectional view of the cable shaving tool with the ramp in the biased position.
Figure 22:
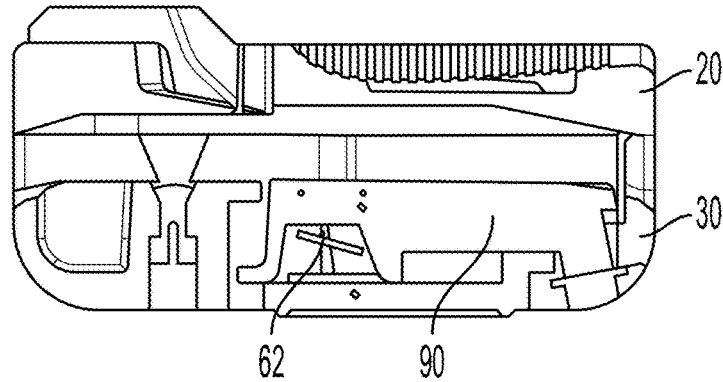
FIG. 22 is a right cross-sectional view of the cable shaving tool with the ramp in the lowered position.
Figure 23:
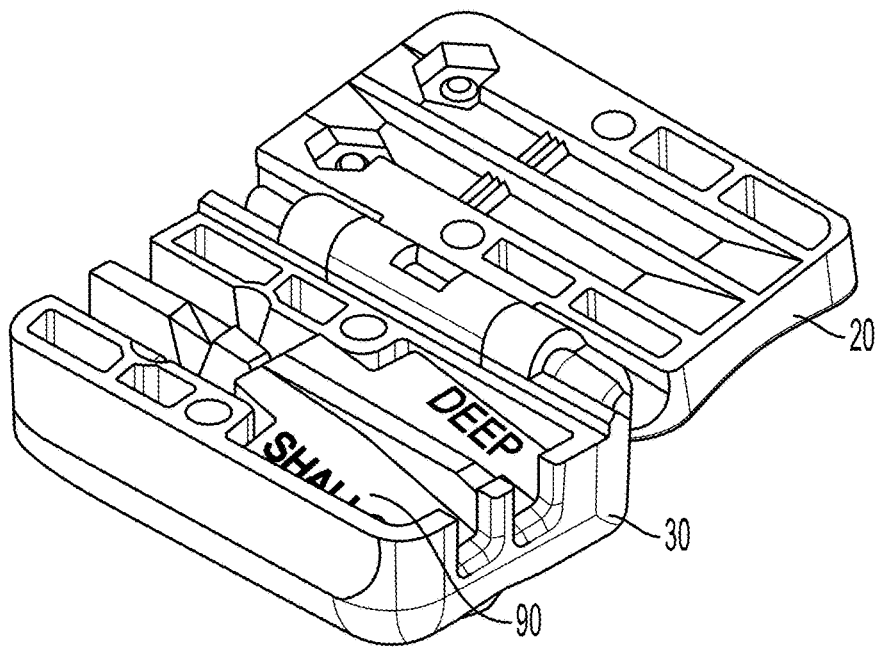
FIG. 23 is a perspective view of the cable shaving tool in the open position.
Figure 24:
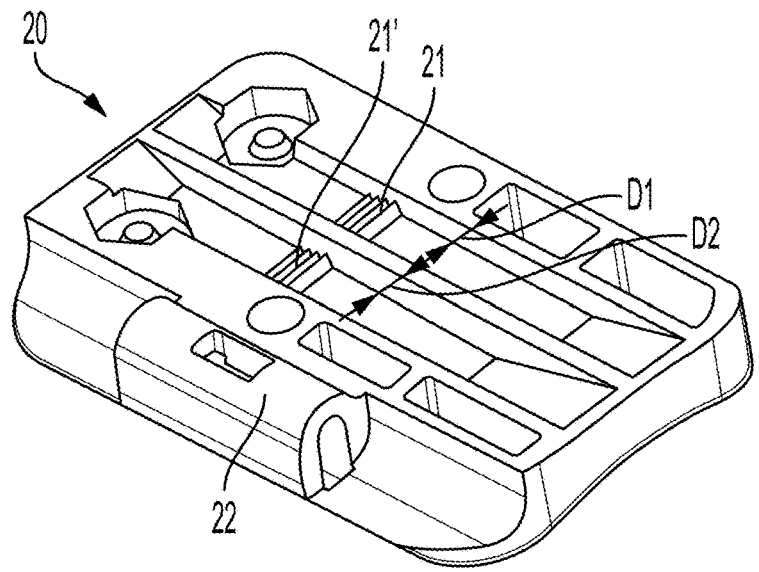
FIG. 24 is an inside perspective view of the housing lid showing the depth of each cable guide.
Figure 25:
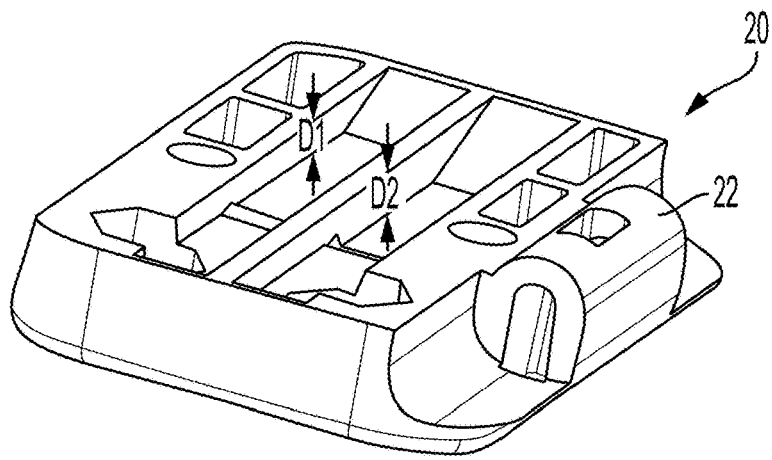
FIG. 25 is an inside perspective view of the housing lid showing the depth of each cable guide.
Figure 26:
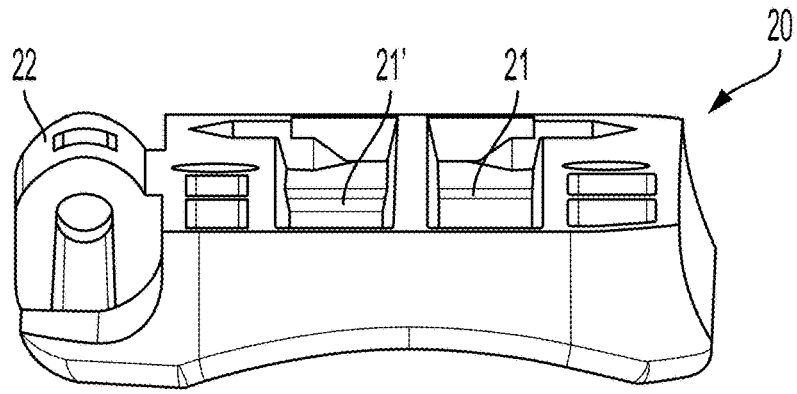
FIG. 26 is an inside perspective view of the housing lid showing the depth of each cable guide.
Figure 27:
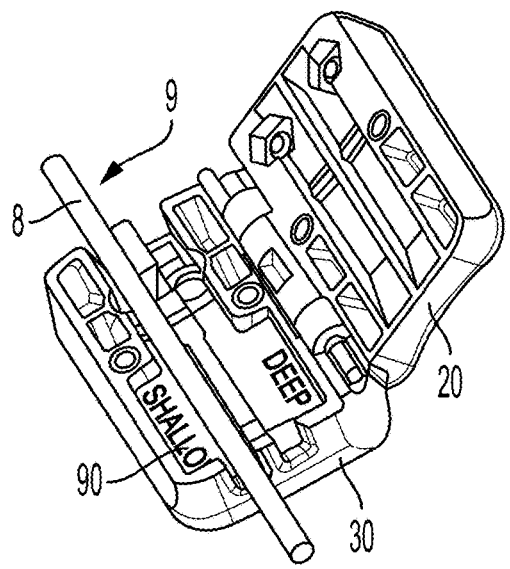
FIG. 27 shows a first step in a method for using the cable shaving tool.
Figure 28:
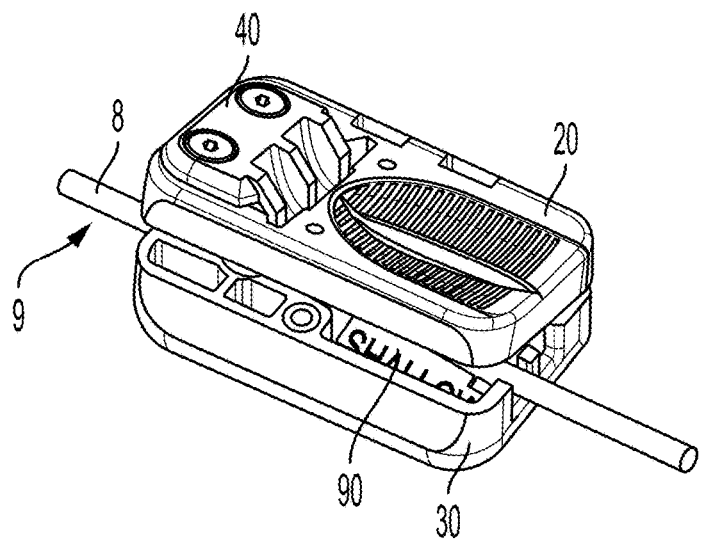
FIG. 28 shows a second step in a method for using the cable shaving tool.
Figure 29:
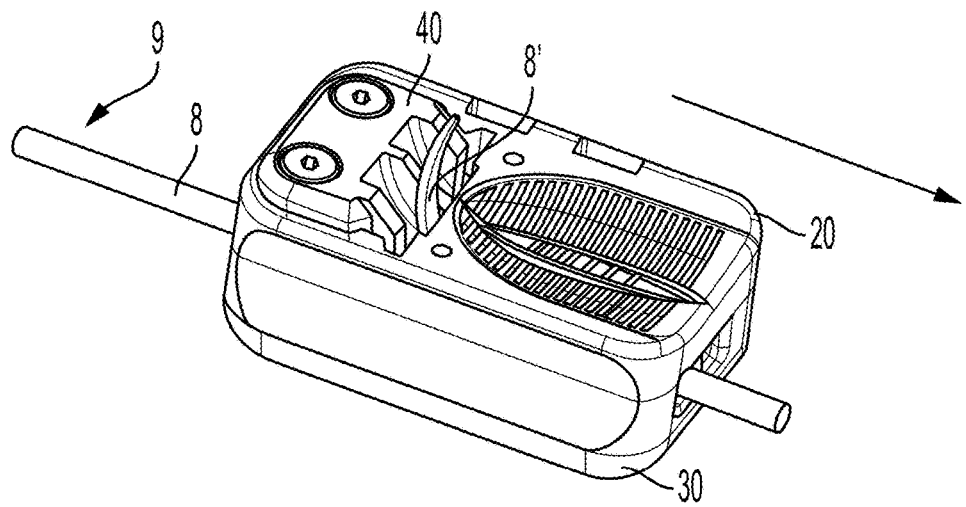
FIG. 29 shows a third step in a method for using the cable shaving tool.
Figure 30:
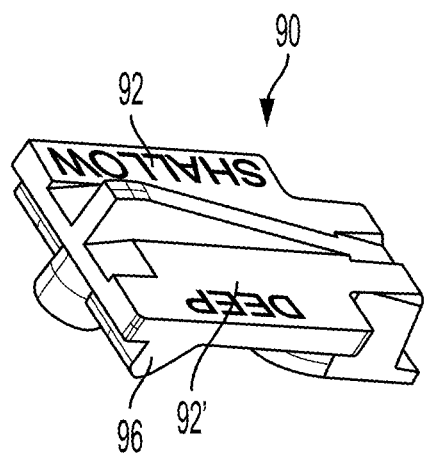
FIG. 30 is a perspective view of the shaving tool cable ramp.
Figure 31:
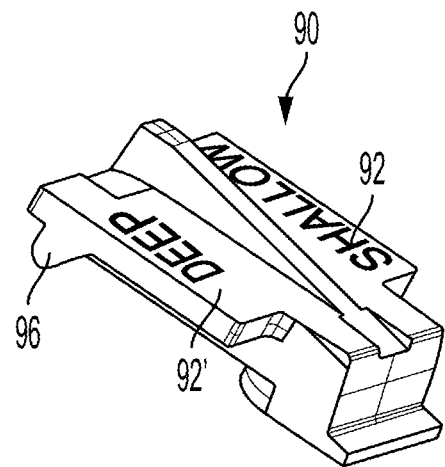
FIG. 31 is a second perspective view of the shaving tool cable ramp.
Figure 32:
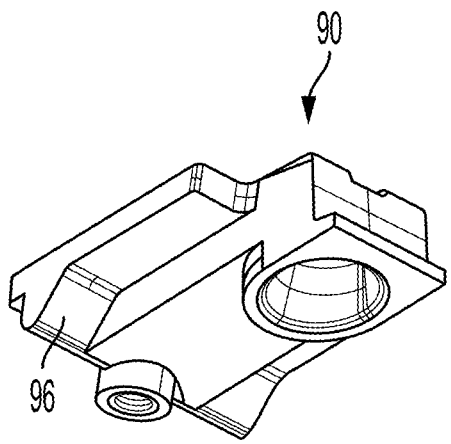
FIG. 32 is a third perspective view of the shaving tool cable ramp.
Figure 33:
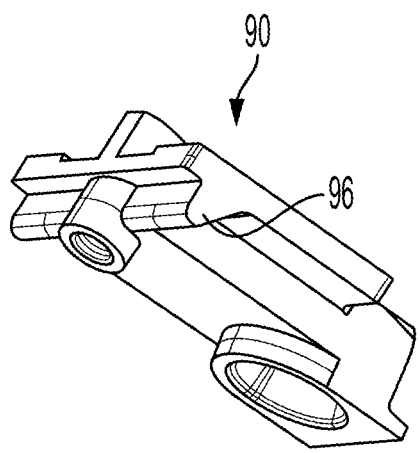
FIG. 33 is a fourth perspective view of the shaving tool cable ramp.

Shown in FIG. 17 and the exploded view of FIG. 18, the shaving tool 10 includes a floating cable ramp 90 disposed in the cavity 37 of the housing bottom 30 or first housing shell. The cable ramp 90 may include a first channel or cable shelf 92 aligned with the first cable groove 34 and a second channel or cable shelf 92' aligned with the second cable groove 34'. The bottom surface of cable ramp 90 includes a ramp hinge 96 for engagement with pivot lip 36 disposed in the housing cavity, and a resilient member 62 which may alternately be a rubber gasket or other resilient member which is known in the art is similarly disposed on the bottom surface of cable ramp 90. As shown in the perspective view of FIG. 16 and cross-sectional elevational views of FIGS. 21 and 22, one end of resilient member 62 contacts a bottom surface 37' of the housing cavity 37 and a second end opposite the first end contacts a portion of a bottom surface of the cable ramp 90. Resilient member 62 is configured to constantly urge the cable ramp 90 toward the topmost surface of the tool 10, requiring a pressure applied towards the housing bottom surface 30b to compress resilient member. The first and second cable shelf 92, 92' extend along a length of the ramp 90, separated by an angled partition wall 95. In order to secure the ramp 90 within the tool 10, ramp fastener 99 may extend through the housing bottom aperture 29 to secure the cable ramp 90 to the housing 30. While secured to the housing 30, the cable ramp hinge 96 is engaged with the pivot lips 36 to create a pivot point, thereby allowing the resilient member 62 to urge only a single end of the ramp towards the top surface of the tool 10 (i.e., the end of ramp 90 which is most central to the interior of the housing 30, closest to the blade end 33). In an embodiment shown in FIG. 16, a flexible spacer member 98 may be inserted between the ramp fastener 99 and the cable ramp 90 to prevent stripping of the connection which holds the ramp 90 to the fastener 99, while still allowing pivotal movement of the cable ramp with respect to the housing 30. While the cable ramp described herein utilizes a hinged, rotational movement, other forms of movement of the cable ramp are not meant to be precluded. In some embodiments, the cable ramp may be move linearly with respect to the housing.

Secured to the housing bottom 30 along the outer wall having first hinge member 32 is housing lid 20 or second housing member. Lid hinge member 22 located along the lid edge is engageable with the first hinge member 32, allowing lid 20 to rotate about hinge pin 60 extending through the first hinge member and the lid hinge member. Upper surface 20a of lid 20 includes an inclined blade support surface 23 which receives a blade 70 and includes one or more chip clearance channels 21, 21' extending entirely through the lid 20. Adjacent lid blade support surface 23 is an ergonomic thumb recess 24 which may include a ridged design to facilitate better contact when gripped at the end of the shaving tool 10.

The end of the housing lid 20 opposite thumb recess 24 includes one or more apertures 28 for securing blade holder 40, which may be tapped or otherwise be configured to provide some other form of contact surface with which to engage blade holder 40. Blade holder 40 is removably secured to the housing lid 20 and includes a flat portion 45 which includes through openings 42 thereon as well as a cantilevered extension portion 46 which terminates at the lower end by inclined bottom surface 46a, having an inclination which is similar to the inclined surface of the lid blade support surface 23. Cantilevered extension portion 46 includes blade channels 44, 44' which facilitate removal of the outer jacket 8 waste during the method of operation of the hand tool 10 (discussed below). During assembly of the hand tool 10, a blade 70, which may be a utility blade, single-sided razor blade, double-sided razor blade or any other cutting edge which is known in the art, is placed within lid blade support surface 23 such that the cutting edge of the blade 70 faces towards the chip clearance channels 21, 21'. Blade holder 40 is then placed onto the top surface of lid 20 such that the bottom surface 46a of the blade holder is in contact with an outer surface of blade 70. Fasteners 41 extend through openings 42 in the blade holder 40 and into the lid 20 for securing the blade holder 40 thereto. While the flat portion 45 of the blade holder sits on the outer surface of the lid 20, the extension portion 46, sits within the lid blade support surface 23 so that the bottom surface 46a applies force necessary to secure the blade 70 within the blade support surface 23. In final position, the blade 70 extends into a portion of the chip clearance channels 21, 21' and at an angle to allow a cutting surface to extend into a portion of the bottom surface 20b. In some embodiments, the blade holder 40, lid blade support surface 23, or both may include a blade adjustment mechanism which would adjust the amount which the cutting surface extends within the bottom surface 20b of the lid, making it possible to provide incremental cut depth adjustments.

Figure 14:
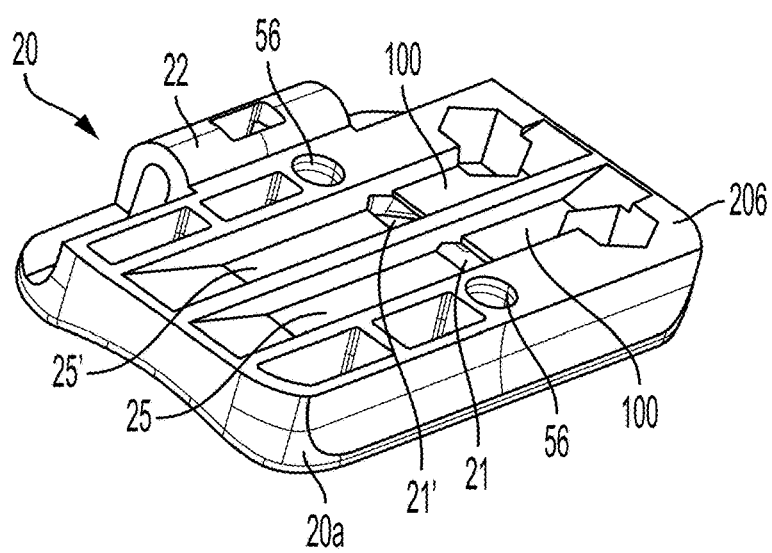
FIG. 14 shows a bottom rear left perspective view of the housing lid.

The bottom surface 20b of lid 20 includes sole portion 100, 100' terminating at chip clearance channel(s) 21, 21' to create a mouth which the blade 70 tip or edge extend therein. Bottom surface 20b further includes one or more upper control surfaces 25, 25' opposite sole portion 100, 100'. The upper control surface(s) 25, 25' sets the blade depth and thereby the depth of cut along a cable by providing a bearing surface for the uncut surface of the cable. As shown in FIG. 14, the upper control surfaces 25, 25' are imbedded within the inside surface 20b at different depths. Thus, the depth of a shave cut on a cable is controlled by the spacing between the blade tip or edge and the upper control surface 25, 25'.

Figure 15:
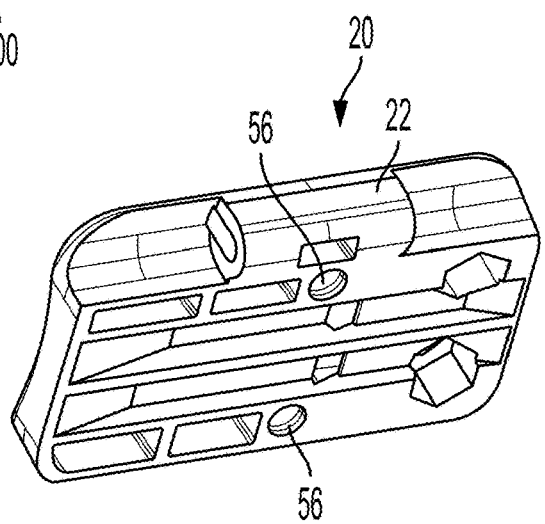
FIG. 15 shows a bottom rear right perspective view of the housing lid.

In one embodiment shown in the exploded view of FIG. 16 and the housing lid interior surface in FIGS. 14 and 15, the shaving tool 10 includes at least one first magnet 50 disposed in a magnet recess 54 of the housing bottom 30 and at least one second magnet 52 disposed in a magnet recess 56 of the housing lid 20. The at least one first and second magnet are positioned adjacent one another when the lid 20 is in the closed position, providing secure closure of the tool. Other methods of providing secure closure of the tool are not meant to be precluded, and may include a latch mechanism, locking mechanism, or any other closure method which would be understood by a person of ordinary skill in the art. In an embodiment shown in FIG. 18, the housing 30 includes one or more indicator members 68, 69 to indicate the depth of cut, which may include a colored resilient indicating member 68, 69 which may be of plastic, silicon, or any other polymer which would produce a resilient member known in the art. While a color may be used to indicate the depth, other indicia to indicate cut depth may be used, including engraving letters, numbers, or symbols on the indicating member. The shave depth indicator members 68, 69 may be disposed in indicator openings 67 in the housing 30 such that they may be removed and replaced as needed. While the housing lid 20 of the shaving tool 10 described herein utilizes a hinged closure, other closure methods are not meant to be precluded. In some embodiment of the shaving tool 10, the lid 20 may be secured to the housing bottom 30 by a track and guide system, causing linear movement of the housing lid with respect to the bottom housing.

While the shaving tool shown in the figures and described herein is to a shaving tool having two channels to perform shaving operations at two different depths, these are for exemplary purposes only, and the present invention should not be meant to preclude a shaving tool which is directed to only a single shaving depth, or one that can incorporate more than two shaving depths. Thus, a person of skill in the art should understand that the cable shaving tool of the present invention can be directed to a device which may perform shaving operations on a cable at any number of predetermined depths.

In order to operate the shaving tool of the present invention, hinged lid 20 is opened by first unlocking the closing mechanism (preferably overcoming the field forces between magnets 50, 52). A cable 9 is placed within the housing, and a cable channel 92, 92' is selected (in some embodiments by using the indicator members 68, 69), to determine the depth of cut to be performed to the cable. After selecting the cable channel 92, 92', the cable 9 is placed within the selected cable channel 92, 92' such that the cable extends throughout the length of the channel along the length L of the cable shaving tool 10. The cable 9 is then fed through corresponding grooves 34, 34' on the ramp end 31 and blade end 33 of the housing which pertain to the selected cable channel 92, 92' (as depicted, groove 34 corresponds to channel 92 and groove 34' corresponds to channel 92') thereby loading the cable within the shaving tool housing 30.

Once the cable 9 is loaded, housing lid 20 is closed, thereby engaging closure mechanism 50, 52 and encapsulating cable 9 within the shaving tool 10 such that the channel 92, 92' and groove 34, 34' surround and engage a bottom surface of the cable 9 and the corresponding sole portion 100, 100' and upper control surface 25, 25' engage an upper surface of the cable 9 (as depicted, sole portion 100 and upper control surface 25 correspond to channel 92 and groove 34, and vice versa). In order to maintain cable 9 within the proper channel or track during cutting operations, the housing partitions 35, 95, as well as the lid partition 55 prevent shifting of the cable 9 while the shaving tool is closed. Due to the resilient member 62, the cable ramp 90 is urged towards the lid 20, which subsequently urges the cable 9 towards the top of sole portion 100, 100' and upper control surface 25, 25'. Thus, the cable 9 is biased towards the mouth formed from chip clearance channel 21, 21' located between sole portion 100, 100' and upper control surface 25, 25' such that blade 70 immediately engages the outer jacket 8 of the cable 9, initiating the shaving process after cable 9 is encapsulated with the shaving tool 10. Thus, the shaving tool creates a zero-clearance cut, meaning that the exact location of the cut is the point at which the edge of blade 70 contacts the section of cable 9 which shaving operations are to be performed on.

Due to the resilient member 62 urging cable ramp 90 in a direction towards the bottom surface 20b of the housing lid when the shaving tool is closed, the cutting depth is controlled by the distance between the upper control surface 25, 25' and the edge of the blade 70 which protrudes through the mouth formed by the chip clearance channel 21, 21' extending through the lid bottom surface 20b. Thus, the cable-shaving tool of the present invention allows for a precise shave cut which can be modified by changing the depth of the recess which terminates in the upper control surface(s) 25, 25' on the bottom surface 20b of the housing lid. For example, the distance between the upper control surface to the blade edge extending within the mouth could be as small as 0.4 mm or as large as 1.2 mm. While not attempting to be limiting but using these predetermined distances as an example, the amount shaved from the upper surface of the cable would be 0.4 mm of the diameter or a 1.2 mm shave from the diameter of the upper surface of the cable.

Once a cable is encapsulated within the shaving tool 10, the cable ramp 90 urges the cable 9 towards the bottom surface 20b of the lid, allowing the sole portion 100, 100' and upper control surface 25, 25' to provide a bearing surface for the uncut portion of the cable after loading. Thus, a precise cutting depth is established and ensures the blade 70 will begin cutting a cable of any diameter within the device of the present invention. In the prior art, a fixed channel height would have to be closely matched to the cable diameter to ensure the blade initiates the cut with the cable. If the channel was sized incorrectly, the cable would not touch the blade to initiate the cut, or the blade would initiate a cut which was too deep. The present invention eliminates that concern. The vertical interaction between the blade 70, cable channel 92, 92' of the cable ramp 90, upper control surface 25, 25' and cable 9 ensure proper shaving operations on cables of varying diameter. The channels (e.g., upper control surface 25, 25', cable channel 92, 92') of the shaving tool 10 may similarly be of any width without any adverse performance of the tool since any resulting clearance within the width of the channel(s) does not affect the shaving operations of the tool. This advantageously allows the cable shaving tool of the present invention to accommodate a range of cable diameters. For example, the outer diameter of the cable jacket 8 may be as small as 1.5 mm or as large as 5 mm, though shaving cut operations on smaller and larger cable diameters are not meant to be precluded.

The method of performing a shaving cut to a cable 9 using the present invention is described as follows. After selecting a midspan of a cable 9 with which to cut, the cable section is encapsulated within the shaving tool 10 as described above, including selecting an appropriate channel for initiating a predetermined depth of cut on the cable 9. After encapsulating cable 9 within the shaving tool 10, the cable ramp 90 urges the outer jacket of cable 9 onto the upper control surface 25, 25' in order to effect cut operation. The portion of the outer jacket which is within the mouth formed by chip clearance channel 21, 21' which contains the cutting edge of the blade 70 immediately begins to pierce the outer jacket 8, thereby initiating the section of the shaving cut operation. The cutting tool 10 is then moved in a direction 105 along the length of the cable 9 towards a direction opposite the blade end 33 of the housing 30. As the blade 70 moves along the cut path, the cutting edge of the blade severs the outer jacket 8 from the cable 9. In some embodiments, the cutting edge capable of severing any portion of the cable 9, including Kevlar yarn, or even the tight buffer of the cable to expose the necessary layer to initiate splicing of the cable at midspan.

As the shaving tool 10 is moved along the length of the cable 9 in the shaving direction 105, the cut portion of the outer sheath or jacket 8 (the cable jacket chip 8') will protrude from the chip clearance channel 21, 21' located on the lid, extending beyond the blade channels 44, 44' such that any clogging within the housing is prevented while additionally allowing for a visual reference on the depth of the shave cut on cable 9. In addition, the depth of the shaving cut can be viewed along the cable 9 after the shaving tool 10 moves along the cable during the shaving operation which exposes the cut portion 85 of the cable 9 above the blade end 33 of the housing. In some embodiment, particularly those in which the shaving tool has multiple channels in which to select a depth of cut, the cutting operation can be ceased and a different depth of cut can be selected if the shaving tool 10 is not shaving the cable 9 to a proper depth. After a desired portion of the cable 9 has been cut, the cable jacket chip 8' of the outer sheath or jacket 8 which is now extending from the blade channels 44, 44' may be cut and the shaving tool 10 may be subsequently opened and removed from the cable 9. While the shaving operation described herein is for the jacket 8 of the cable 9, this is for exemplary purposes only, and other shaving operations are not meant to be precluded. For example, the shaving tool could be used to shave the bottom surface of the cable or even could be used to perform shaving cuts which are not linear, such as spiral shave cut operations. Also, the shaving tool of the present invention may further be used for end stripping access to a cable.

Thus, the present invention provides one or more of the following advantages: providing a cable cutting tool which may accomplish shaving cut on a range of cable diameters; providing a midspan shaving tool which may perform precise cutting operation without need to adjust a blade depth; providing a midspan shaving tool that provides multiple cutting depth which are working across a range of cable diameters; and providing a zero-clearance vertical fit on a cable at the start of the cut. The present invention may accomplish a shaving operation across a plurality of depths, and provides a shaving tool which is easy to use, safe, and effective.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for using a cable-shaving tool for shaving of a cable jacket, the method comprising:
   providing a cable-shaving tool having:
   a housing bottom having a first hinge member along an upper edge of the housing bottom, a first and second cable groove extending through a length of the tool housing and a cavity in the housing bottom;
   a second housing shell having an interior portion, an exterior portion, and a second hinge member along a lid edge, the second hinge member engageable with the first hinge member such that the second housing shell may rotate about said first hinge member, said interior portion including a first recess having a first depth terminating in a first upper control surface, said interior portion including a second recess having a second depth terminating in a second upper control surface;
a blade holder removably secured to the second housing shell;
a blade removably securable between the blade holder and a blade support surface on the second housing shell, the blade extending within a portion of the first and second recess;
a moveable cable ramp disposed in the cavity of the housing bottom, the cable ramp having first and second cable shelf extending along a length of the ramp, the cable ramp configured to urge the first and second cable shelf toward the blade when the second housing shell is in a closed position; and
wherein said first cable groove, said first cable shelf, and said first upper control surface are aligned when said second housing shell is in a closed position and said second cable groove, said second cable shelf, and said second upper control surface are aligned when said second housing shell is in a closed position;
ensuring the second housing shell is in an open position;
selecting said first or second cable groove;
placing a portion of a cable in the housing bottom such said portion is within said first or second cable groove;
closing the second housing shell to encapsulate said cable portion within said cable-shaving tool;
moving the cable-shaving tool in a direction along said cable such that said blade severs said cable jacket, thereby shaving a portion of the cable jacket a predetermined depth determined by a distance between the first upper control surface and an edge of the blade extending within the first recess;
moving the second housing shell to the open position; and
removing the cable-shaving tool from the shaved cable.

2. The method of claim 1 wherein the cable-shaving tool is a configured to shave a midspan or an end of the cable.

3. A cable-shaving tool for shaving of a cable jacket, the tool comprising:
a first housing shell having a first hinge member along an upper edge of the first housing shell, a cavity, and at least one cable groove extending through a length of the first housing shell;
a second housing shell having an interior portion, an exterior portion, and a second hinge member along a second housing shell edge, the second hinge member engageable with the first hinge member wherein the second housing shell is rotatable about said first hinge member, said interior portion including at least one recess having an upper control surface;
a blade holder removably secured to the second housing shell;
a blade removably securable between the blade holder and a blade support surface on the second housing shell, the blade extending within a portion of the at least one recess; and
a movable cable ramp disposed in the cavity of the first housing shell, the cable ramp having at least one cable shelf extending along a length of the ramp, said cable shelf is configured to urge the at least one cable shelf toward the blade when the second housing shell is in a closed position;
wherein the at least one cable groove is configured to removably receive a cable therein so that the cable is encapsulated within the cable-shaving tool upon closing the second housing shell whereby the ramp urges the cable jacket against the upper control surface of the at least one recess, and said blade initiates a cut of a predetermined depth into said cable jacket upon closing of the second housing shell and shaves a portion of the cable jacket upon moving the cable-shaving tool along a length of the cable, and
wherein the cable ramp further includes an end having a ramp hinge, such that said ramp is configured to pivot about said end as said at least one cable shelf is urged towards the blade.

4. The cable-shaving tool according to claim 3, further including a first magnet secured in said first housing shell and a second magnet secured in said second housing shell wherein the first contacts the second magnet when the second housing shell is in the closed position, holding the cable-shaving tool in the closed position when moving the cable-shaving tool along the length of the cable.

5. The cable-shaving tool according to claim 3, wherein the cable ramp further includes a resilient member, said resilient member within a bottom surface of said cable ramp and in contact with a bottom surface of said first housing shell cavity.

6. The cable-shaving tool according to claim 3 wherein said second housing shell further includes at least one chip clearance channel and said blade holder further includes at least one blade channel.

7. The cable-shaving tool according to claim 3 wherein said second housing shell exterior portion includes a recess having ridges.

8. The cable-shaving tool according to claim 3 wherein said first housing shell exterior portion includes a recess having ridges.

9. The cable-shaving tool according to claim 3, wherein said first housing shell further includes at least one indicator member.

10. The cable-shaving tool according to claim 3 wherein the cable-shaving tool is configured to shave a midspan or an end of the cable.

11. A cable-shaving tool for shaving of a cable jacket, the tool comprising:
a first housing shell having a first hinge member along an upper edge of the first housing shell, a first and second cable groove extending through a length of the first housing shell, and a cavity in the first housing shell;
a second housing shell having an interior portion, an exterior portion, and a second hinge member along a lid edge, the second hinge member engageable with the first hinge member wherein the second housing shell is rotatable about said first hinge member, said interior portion including a first recess having a first depth terminating in a first upper control surface, said interior portion including a second recess having a second depth terminating in a second upper control surface;
a blade holder removably secured to the second housing shell;
a blade removably securable between the blade holder and a blade support surface on the second housing shell, the blade extending within a portion of the first and second recess; and
a movable cable ramp disposed in the cavity of the first housing shell, the cable ramp having first and second cable shelf extending along a length of the ramp, the cable ramp is configured to urge the first and second cable shelf toward the blade when the second housing shell is in a closed position;
wherein said first cable groove, said first cable shelf, and said first upper control surface are aligned when said second housing shell is in a closed position and said second cable groove, said second cable shelf, and said second upper control surface are aligned when said second housing shell is in a closed position;

wherein the cable grooves are configured to removably receive a cable therein so that the cable is encapsulated within the tool upon closing the second housing shell whereby that the ramp urges the cable jacket against the first upper control surface and/or the second upper control surface, and said blade initiates a cut of a predetermined depth into the cable jacket upon closing of the second housing shell and shaves a portion of the cable jacket upon moving the cable-shaving tool along a length of the cable; and wherein said predetermined depth is the distance from said blade to said first upper control surface and/or said second upper control surface.

12. The cable-shaving tool according to claim 11 wherein the cable ramp further includes an end having a ramp hinge, such that said ramp is configured to pivot about said end as said cable shelf is urged towards the blade.

13. The cable-shaving tool according to claim 11, further including a magnetic closure mechanism.

14. The cable-shaving tool according to claim 11, wherein the cable ramp further includes a resilient member, said resilient member within a bottom surface of said cable ramp and in contact with a bottom surface of said first housing shell cavity.

15. The cable-shaving tool according to claim 11 wherein said second housing shell further includes a first chip clearance channel and a second chip clearance channel and said blade holder further includes a first blade channel and a second blade channel.

16. The cable-shaving tool according to claim 11, wherein said first housing shell further includes a first and second indicator member.

17. The cable-shaving tool according to claim 11 wherein the cable-shaving tool is configured to shave a midspan or an end the cable.

18. The cable-shaving tool according to claim 11 wherein said first housing shell exterior portion includes a recess having ridges.

19. The cable-shaving tool according to claim 11 wherein said second housing shell exterior portion includes a recess having ridges.

* * * * *